United States Patent
Su et al.

(10) Patent No.: US 7,548,285 B2
(45) Date of Patent: Jun. 16, 2009

(54) ACTIVE DEVICE ARRAY SUBSTRATE AND DRIVING METHOD THEREOF

(75) Inventors: Jenn-Jia Su, Hsinchu (TW); Ting-Wei Su, Hsinchu (TW); Wen-Hao Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 200 days.

(21) Appl. No.: 11/766,804

(22) Filed: Jun. 22, 2007

(65) Prior Publication Data
US 2008/0198290 A1   Aug. 21, 2008

(30) Foreign Application Priority Data
Feb. 15, 2007   (TW) .............................. 96105745 A

(51) Int. Cl.
*G02F 1/136* (2006.01)
*G02F 1/1343* (2006.01)
*G09G 3/36* (2006.01)

(52) U.S. Cl. .................. 349/48; 349/144; 349/143; 349/42; 345/87; 345/92

(58) Field of Classification Search .................. 349/48, 349/143, 42, 144, 139; 345/50, 55, 90, 92, 345/95, 87, 204
See application file for complete search history.

(56) References Cited

U.S. PATENT DOCUMENTS

| | | | |
|---|---|---|---|
| 5,677,744 A * | 10/1997 | Yoneda et al. ................ 349/12 |
| 5,870,075 A * | 2/1999 | Yamazaki et al. ............. 345/92 |
| 6,486,930 B1 | 11/2002 | Kwon | |
| 6,922,183 B2 * | 7/2005 | Ting et al. ...................... 345/87 |
| 6,933,910 B2 | 8/2005 | Kodate et al. | |
| 7,034,789 B2 * | 4/2006 | Takeuchi et al. .............. 345/90 |
| 7,206,048 B2 * | 4/2007 | Song .......................... 349/129 |
| 7,256,861 B2 * | 8/2007 | Park et al. .................... 349/187 |
| 2005/0200788 A1 | 9/2005 | Edwards | |
| 2005/0213015 A1 | 9/2005 | Shimoshikiryo | |
| 2007/0052902 A1 * | 3/2007 | Yoo et al. .................... 349/144 |
| 2007/0064164 A1 * | 3/2007 | Tasaka et al. ................. 349/38 |
| 2007/0229427 A1 * | 10/2007 | Chen et al. .................... 345/92 |

* cited by examiner

*Primary Examiner*—Frank G Font
*Assistant Examiner*—Robert Tavlykaev
(74) *Attorney, Agent, or Firm*—Jianq Chyun IP Office

(57) ABSTRACT

An active device array substrate including a plurality of scan lines, data lines and pixel units is provided. The pixel units are connected to the scan lines and data lines correspondingly, and each pixel unit includes a first active device, a second active device, a first pixel electrode, and a second pixel electrode. The first active device has a first gate, a first source connected to one of the data lines, and a first drain. The second active device has a second gate, a second source, and a second drain, wherein the first and the second gates are connected to the same scan line. The first and the second pixel electrodes are connected to the first drain and the second drain, respectively. The second source of each pixel unit is connected to the first pixel electrode of an adjacent pixel unit controlled by the next scan line.

11 Claims, 8 Drawing Sheets

ACTIVE DEVICE ARRAY SUBSTRATE AND DRIVING METHOD THEREOF

CROSS-REFERENCE TO RELATED APPLICATION

This application claims the priority benefit of Taiwan application serial no. 96105745, filed Feb. 15, 2007. All disclosure of the Taiwan application is incorporated herein by reference.

BACKGROUND OF THE INVENTION

1. Field of the Invention

The present invention relates to a liquid crystal display (LCD) panel. More particularly, the present invention relates to an active device array substrate and a driving method thereof.

2. Description of Related Art

Presently, the performance of thin film transistor liquid crystal display (TFT-LCD) is proceeding towards high contrast ratio, no gray level inversion, low color shift, high luminance, high color richness, high color saturation, quick response, and wide viewing angle etc. Existing techniques for achieving wide viewing angle include twisted nematic (TN) liquid crystal plus wide viewing film, in-plane switching (IPS) LCD, fringe field switching LCD, and multi-domain vertically alignment (MVA) TFT-LCD etc.

Take a conventional MVA-LCD panel as example, the alignment protrusions or slits formed on the color filter substrate or TFT array substrate allow liquid crystal molecules to be arranged in different directions so that a plurality of different alignment domains can be obtained. Thus, wide viewing angle can be achieved by the MVA-LCD panel.

FIG. 1 illustrates the relationship between the normalized transmittance and the gray level of a conventional MVA LCD panel. Referring to FIG. 1, the abscissa indicates gray level and the ordinate indicates normalized transmittance. As shown in FIG. 1, even though the conventional MVA-LCD panel can achieve a wide viewing angle, the transmittance-level curve has different curvatures along with the changes of the viewing angle. In other words, when the viewing angle changes, the brightness displayed by the conventional MVA-LCD also changes, so that the color shift or color washout may be produced.

Various conventional techniques have been provided for resolving the issue of color shift or color washout. One of the methods is to form an extra capacitor in a single pixel unit. Different pixel electrodes in the single pixel unit respectively produce different electric fields through capacitance coupling, so that the liquid crystal molecules above the different pixel electrodes have different arrangements. Even though color shift is reduced, such method may cause reduction in the display quality due to the RC delay effect thereof.

Another method is to add a transistor in each pixel unit. In other words, each single pixel unit has two transistors. With these two transistors, two pixel electrodes in a single pixel unit produce two different electric fields so that the liquid crystal molecules above the pixel electrodes have different arrangements and accordingly color shift is reduced. However, in this method, two transistors have to be formed in a single pixel unit and the number of scan lines or data lines has to be increased, therefore both the complexity of the driving circuit and the fabricating cost thereof are increased.

Other conventional techniques for reducing color shift, such as U.S. Pat. No. 6,486,930, U.S. Pat. No. 6,933,910, and U.S. Pat No. 2005/0200788 etc, have been disclosed. For example, a pixel unit array structure provided in US 2005/0200788 can reduce color shift without increasing the number of scan lines or data lines; however, a more complex driving method has to be adopted in this patent to allow two pixel electrodes in a single pixel unit to produce different electric fields. Specifically, in U.S. 2005/0200788, the data signals to be inputted into the same pixel unit are not outputted continuously; therefore a memory has to be installed in the driving circuit in order to reorder the output data signals. Such design increases both the complexity of signal processing and the fabricating cost of the driving circuit.

SUMMARY OF THE INVENTION

Accordingly, the present invention is directed to an active device array substrate for reducing color shift without increasing the complexity of a driving circuit thereof.

The present invention further provides a driving method suitable for driving a liquid crystal display (LCD) having foregoing active device array substrate.

As embodied and broadly described herein, the present invention provides an active device array substrate including a plurality of scan lines, a plurality of data lines, and a plurality of pixel units. The pixel units are connected to the scan lines and the data lines correspondingly, and each pixel unit includes a first active device, a second active device, a first pixel electrode, and a second pixel electrode. The first active device has a first gate, a first source connected to one of the data lines, and a first drain. The second active device has a second gate, a second source, and a second drain, wherein the first gate and the second gate are connected to the same scan line. The first pixel electrode is connected to the first drain. The second pixel electrode is connected to the second drain. The second source in each pixel unit is connected to the first pixel electrode of an adjacent pixel unit controlled by the next scan line.

According to an embodiment of the present invention, the area of the first pixel electrode and that of the second pixel electrode are substantially equal.

According to an embodiment of the present invention, the active device includes a thin film transistor (TFT), wherein the TFT may be an a-Si TFT or a poly-Si TFT.

According to an embodiment of the present invention, the first pixel electrodes of the pixel units in the same line are aligned with each other in the direction of the column, while in another embodiment of the present invention, the second pixel electrodes of the pixel units in the same line are aligned with each other in the direction of the column.

According to an embodiment of the present invention, in the pixel units of the same line, those first pixel electrodes connected to even data lines are aligned with each other in the direction of the line, while those first pixel electrodes connected to odd data lines are aligned with each other in the direction of the line.

According to an embodiment of the present invention, the area of each first pixel electrode connected to even data lines is substantially different from that of each first pixel electrode connected to odd data lines.

According to an embodiment of the present invention, the first and the second active devices are located at the same side of the scan line connected thereto.

The present invention further provides a driving method which is suitable for driving a LCD panel having the active device array substrate described above. The driving method includes sequentially turning on the first active devices and the second active devices of the pixel units connected to the scan lines to sequentially input data signals into pixel units of different columns. The method for inputting data signals into each pixel unit includes following steps. First, the first active device and the second active device of the pixel unit connected to one of the scan lines and the first active device and the second active device of the adjacent pixel unit connected to the next scan line are turned on simultaneously to input a data signal into the second pixel electrode of the pixel unit connected to the one of the scan lines. Next, the first active device and the second active device of the adjacent pixel unit connected to the next scan line and the first active device and the second active device of the pixel unit connected to the one of the scan lines are turned off sequentially to input another data signal into the first pixel electrode of the pixel unit connected to the one of the scan lines.

According to an embodiment of the present invention, the input data signal is P1 when the first active device and the second active device of the pixel unit connected to the one of the scan lines and the first active device and the second active device of the adjacent pixel unit connected to the next scan line are turned on at the same time, and the input data signal is P2 when the first active device and the second active device of the adjacent pixel unit connected to the next scan line are turned off and the first active device and the second active device of the pixel unit connected to the scan line are still turned on, and wherein P1≠P2.

As described above, in the present invention, color shift is reduced without increasing the number of scan lines or data lines. In addition, data reordering procedure is not necessary for driving an active device array substrate in the present invention, thus, the driving method of an active device array substrate provided by the present invention has low complexity and accordingly the fabricating cost of the active device array substrate is reduced.

In order to make the aforementioned and other objects, features and advantages of the present invention comprehensible, preferred embodiments accompanied with figures are described in detail below.

BRIEF DESCRIPTION OF THE DRAWINGS

The accompanying-drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
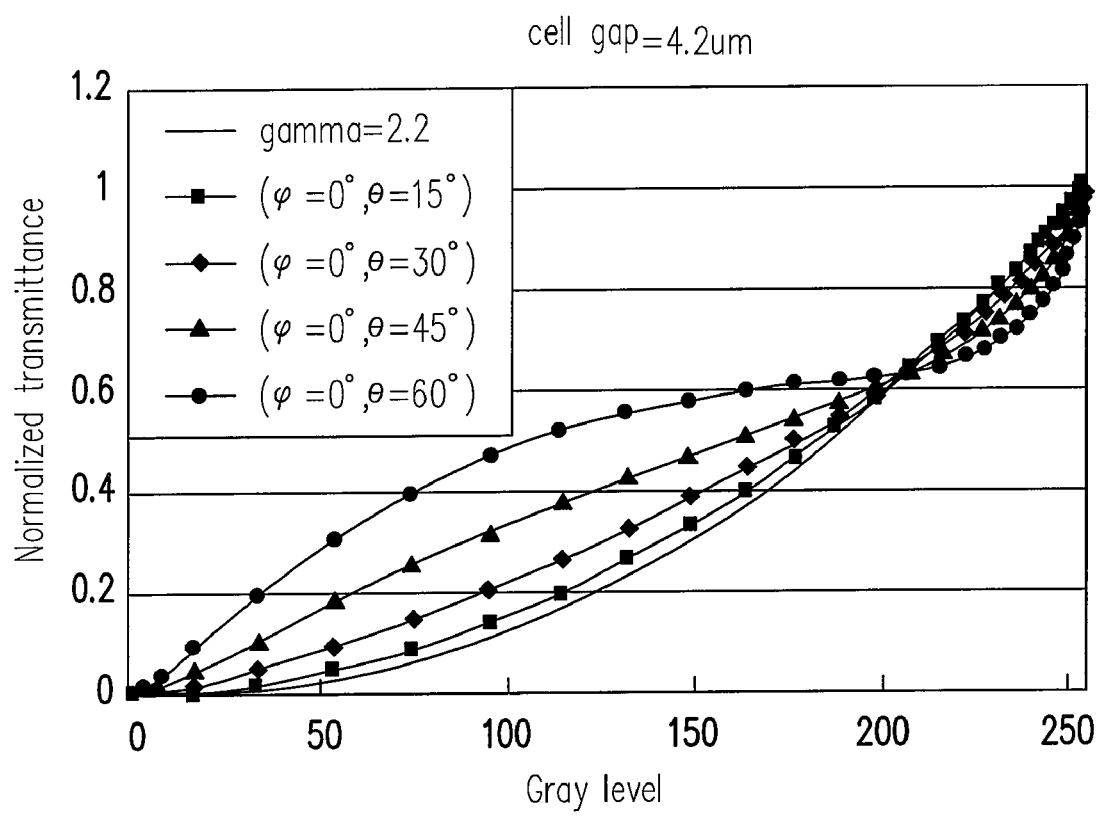
FIG. 1 illustrates the relationship between the normalized transmittance and the gray level of a conventional multi-domain vertically alignment (MVA) liquid crystal display (LCD) panel.
Figure 2A:
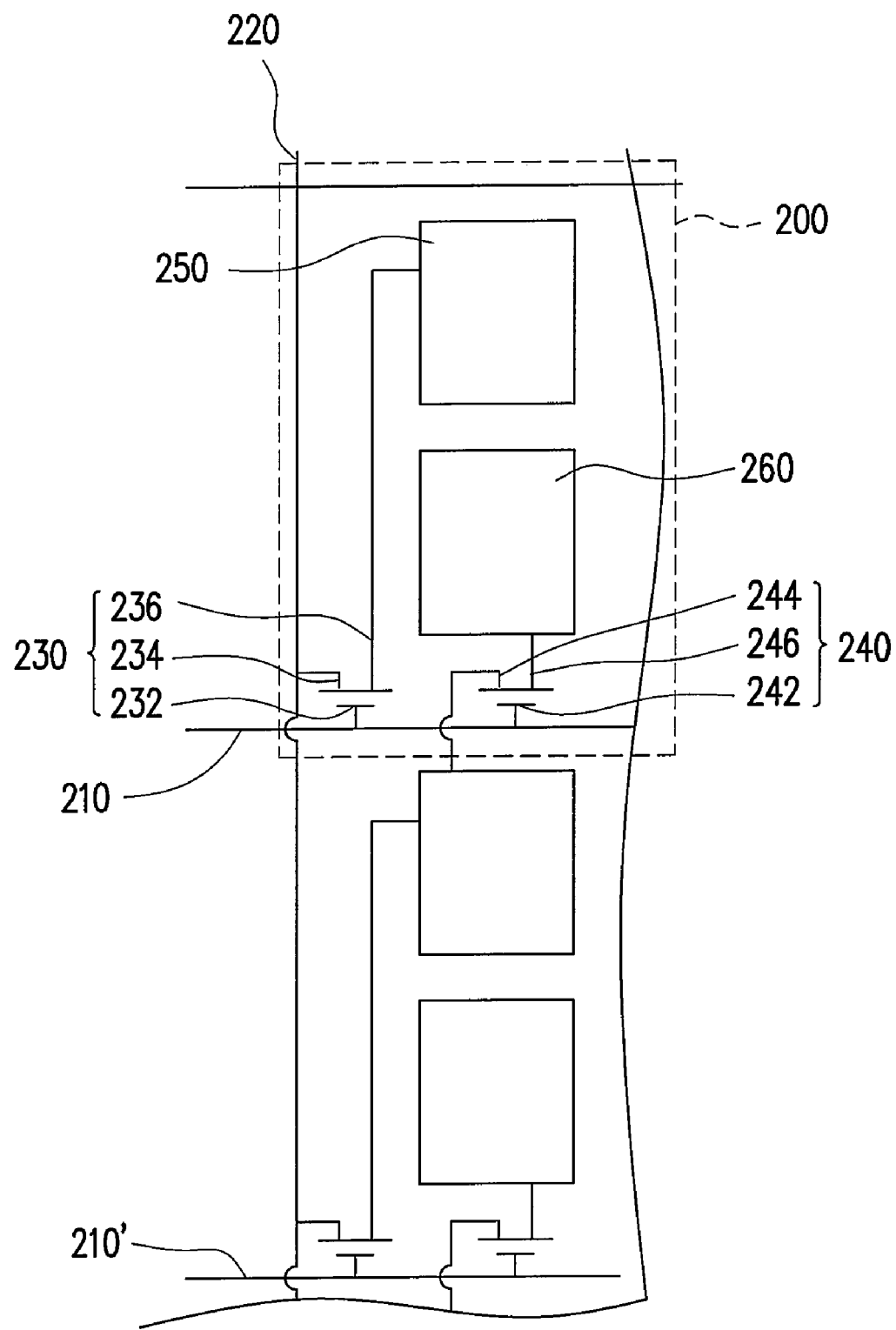
FIG. 2A is a diagram of an active device array substrate according to an embodiment of the present invention.

FIG. 2A is a diagram of an active device array substrate according to an embodiment of the present invention. Referring to FIG. 2A, in the present embodiment, only two pixel units 200 are illustrated in the active device array substrate 20 for the convenience of description. As shown in FIG. 2A, the active device array substrate 20 includes a plurality of scan lines 210, a plurality of data lines 220, and a plurality of pixel units 200. The pixel units 200 are connected to the scan lines 210 and data lines 220 correspondingly, and each pixel unit 200 includes a first active device 230, a second active device 240, a first pixel electrode 250, and a second pixel electrode 260. In the present embodiment, the first active device 230 and the second active device 240 may be a-Si thin film transistors (TFTs); however, the first active device 230 and the second active device 240 may also be poly-Si TFTs or other type of switches. Besides, in the present embodiment, the first active device 230 and the second active device 240 are located at the same side of the scan line 210 connected thereto; however, the present invention is not limited thereto.

Referring to FIG. 2A again, the first active device 230 has a first gate 232, a first source 234, and a first drain 236. The second active device 240 has a second gate 242, a second source 244, and a second drain 246. As shown in FIG. 2A, the first gate 232 and the second gate 242 are connected to the same scan line 210, the first pixel electrode 250 is connected to the first drain 236, and the second pixel electrode 260 is connected to the second drain 246. The first source 234 in each pixel is connected to the corresponding data line 220 while the second source 244 in each pixel unit 200 is connected to the first pixel electrode 250 of an adjacent pixel unit controlled by the next scan line 210'. Specifically, in each pixel unit 200, the second source 244 may be directly connected to the first pixel electrode 250 of the adjacent pixel unit controlled by the next scan line 210' through a contact opening. Alternatively, in each pixel unit 200, the second source 244 may also be electrically connected to the first pixel electrode 250 of the adjacent pixel unit controlled by the next scan line 210' through other wiring.

Figure 2B:
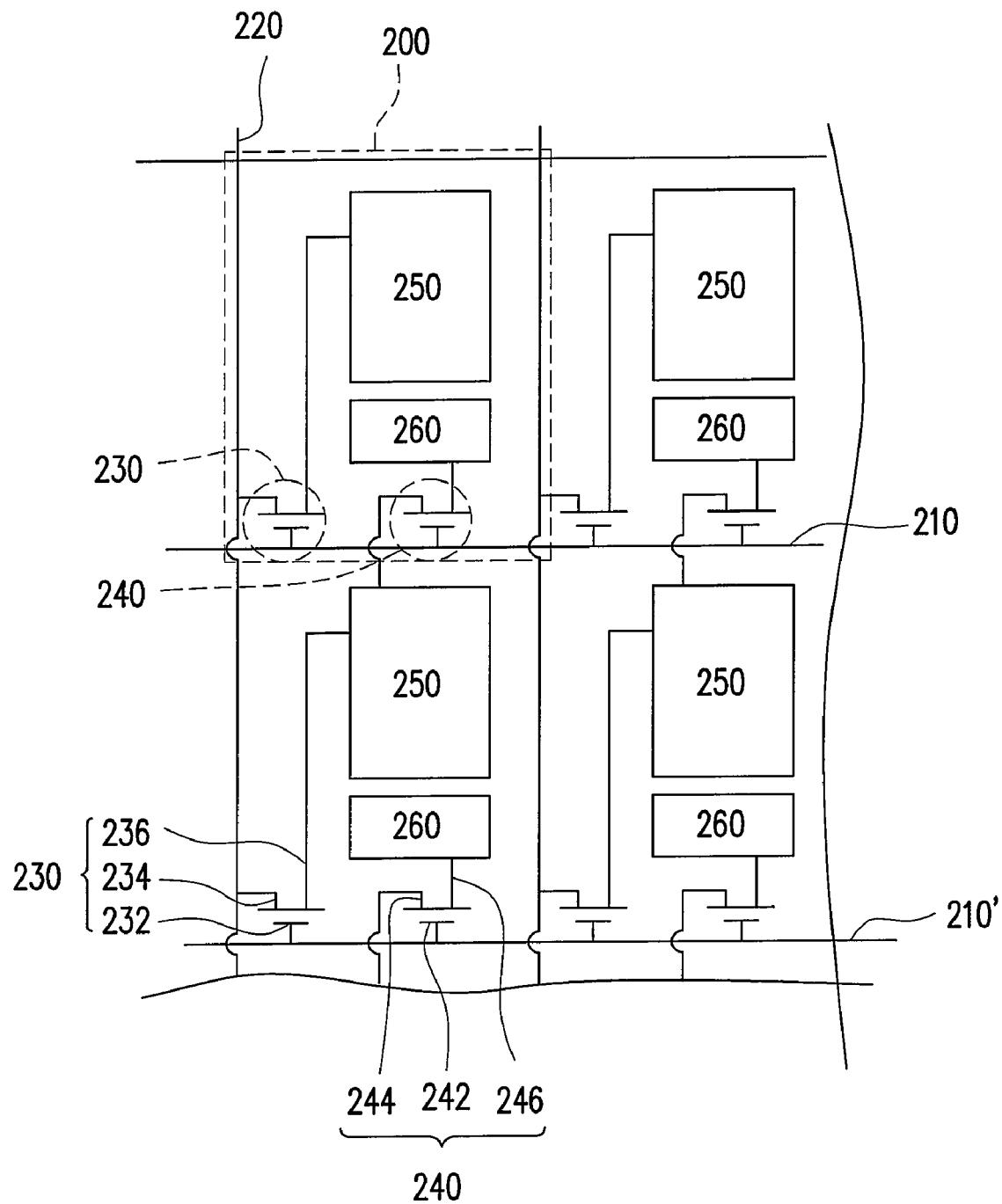
FIG. 2B is a diagram of an active device array substrate according to another embodiment of the present invention.
Figure 2C:
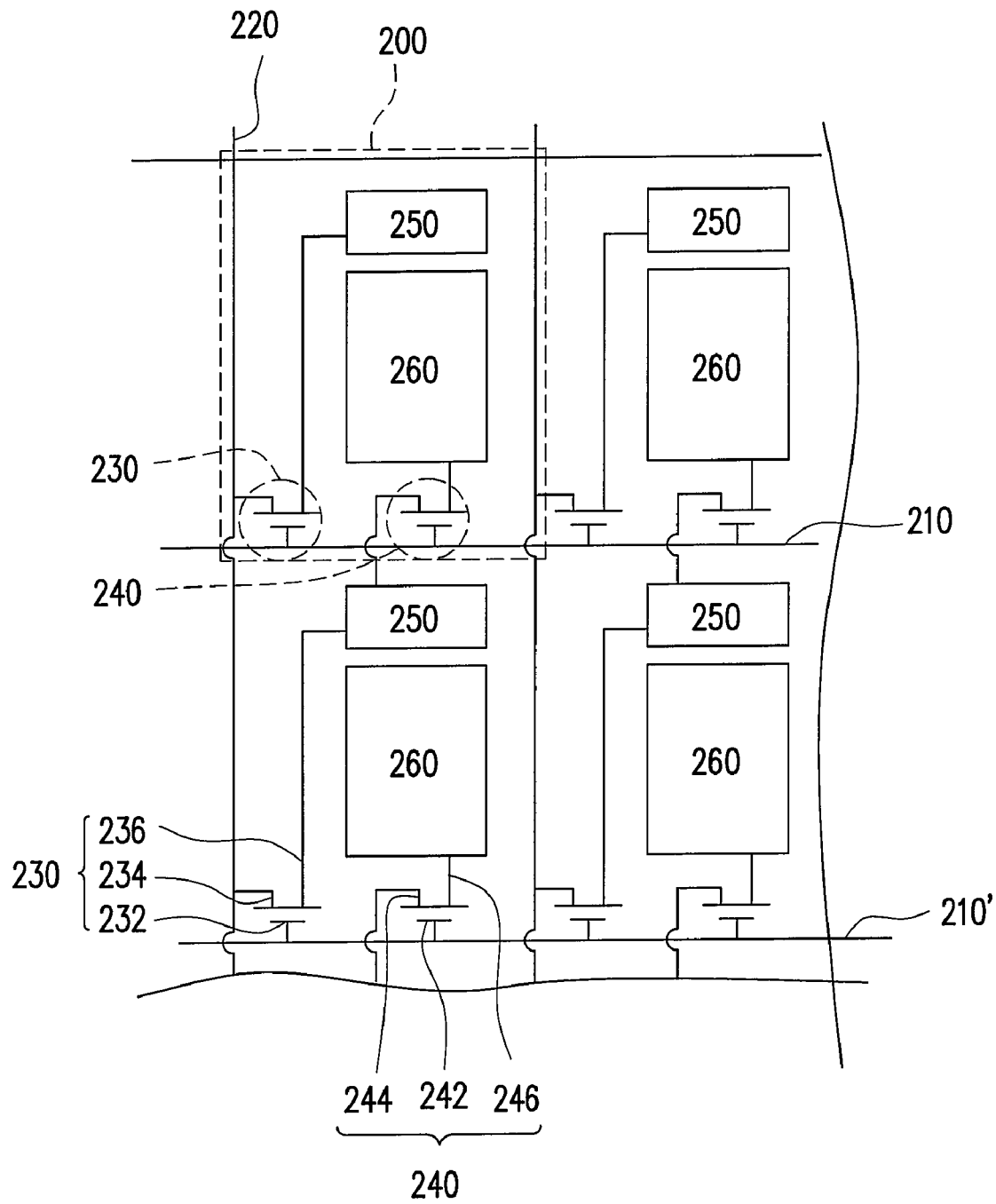
FIG. 2C is a diagram of an active device array substrate according to another embodiment of the present invention.

It should be noted here that according to the present invention, the proportion of the area of the first pixel electrode 250 to that of the second pixel electrode 260 in each pixel unit 200 can be adjusted to optimize the performance in color shift reduction. For example, in FIG. 2A, the area of the first pixel electrode 250 and that of the second pixel electrode 260 may be substantially identical; however, as shown in FIG. 2B, the area of the first pixel electrode 250 may be larger than that of the second pixel electrode 260 according to the requirement. In addition, as shown in FIG. 2C, according to the present invention, the area of the second pixel electrode 260 may be larger than that of the first pixel electrode 250. In each pixel unit 200, the proportion of the area of the first pixel electrode 250 to the area of the second pixel electrode 260 may be adjusted according to design requirement, and the layout and area proportion of the pixel electrodes are not restricted by the present invention.

As shown in FIG. 2B and FIG. 2C, the first pixel electrodes 250 in the pixel units 200 of the same line are aligned with each other in the direction of the line, and the second pixel electrodes 260 of the pixel units 200 of the same line are aligned with each other in the direction of the line. Certainly, in another embodiments of the present invention, it may also be that only the first pixel electrodes 250 or the second pixel electrodes 260 in the pixel units 200 of the same line are aligned with each other in the direction of the line.

Actually, besides the performance in color shift reduction, the affection of different area proportion to liquid crystal coupling capacitance effect and the charging capability of the active devices has to be considered too. Specifically, the charging capability of the second pixel electrode 260 is related to the area of the first pixel electrode 250 controlled by the next scan lines 210'. For example, in a pixel unit 200, if the area of the first pixel electrode 250 is larger and the area of the second pixel electrode 260 is smaller (as shown in FIG. 2B), the coupling capacitance of the pixel unit 200 is small. In such case, a first active device 230 having good charging capability is usually adopted so that the second pixel electrode 260 can be charged successfully.

As shown in FIG. 2C, in the pixel unit 200, if the area of the first pixel electrode 250 is smaller and the area of the second pixel electrode 260 is larger, it is advantageous to the charging of the second pixel electrode 260 even though the coupling capacitance of the pixel unit 200 is increased slightly. As described above, a designer may select a suitable area proportion (i.e. the proportion of the area of the first pixel electrode 250 to the area of the second pixel electrode 260) according to the design requirement of different LCD.

Figure 2D:
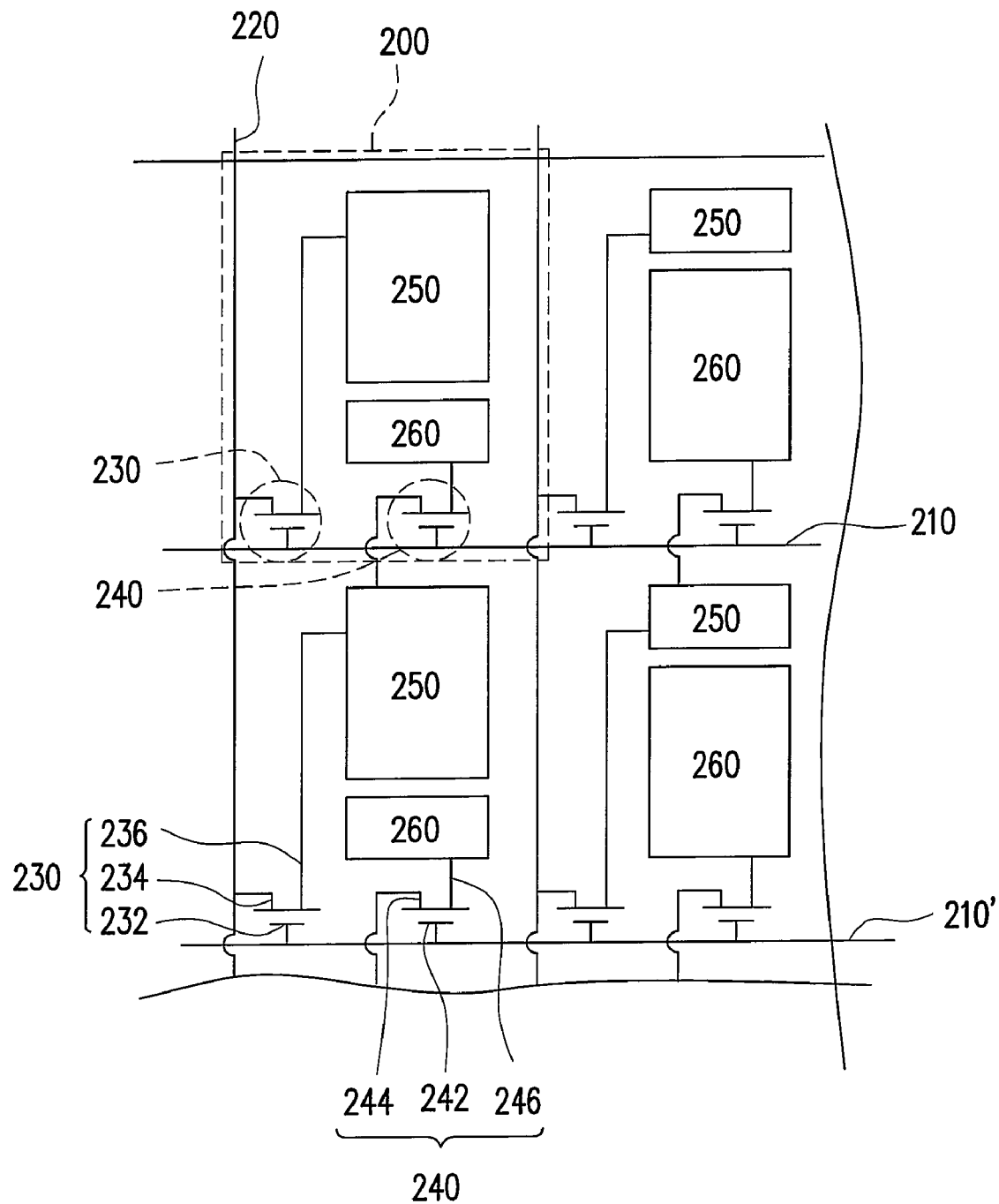
FIG. 2D is a diagram of an active device array substrate according to yet another embodiment of the present invention.

FIG. 2D is a diagram of an active device array substrate according to yet another embodiment of the present invention. Referring to FIG. 2D, in the pixel units 200 of the same line, the first pixel electrodes 250 connected to even data lines 220 are aligned with each other in the direction of the line, while the first pixel electrodes 250 connected to odd data lines 220 are aligned with each other in the direction of the line. In the present embodiment, the area of each first pixel electrode 250 connected to even data line 220 is smaller, while the area of each first pixel electrode 250 connected to odd data line 220 is larger. However, in another embodiments of the present invention, the area of each first pixel electrode 250 connected to even data line 220 may be larger while the area of each first pixel electrode 250 connected to odd data line 220 may be smaller.

Figure 3:
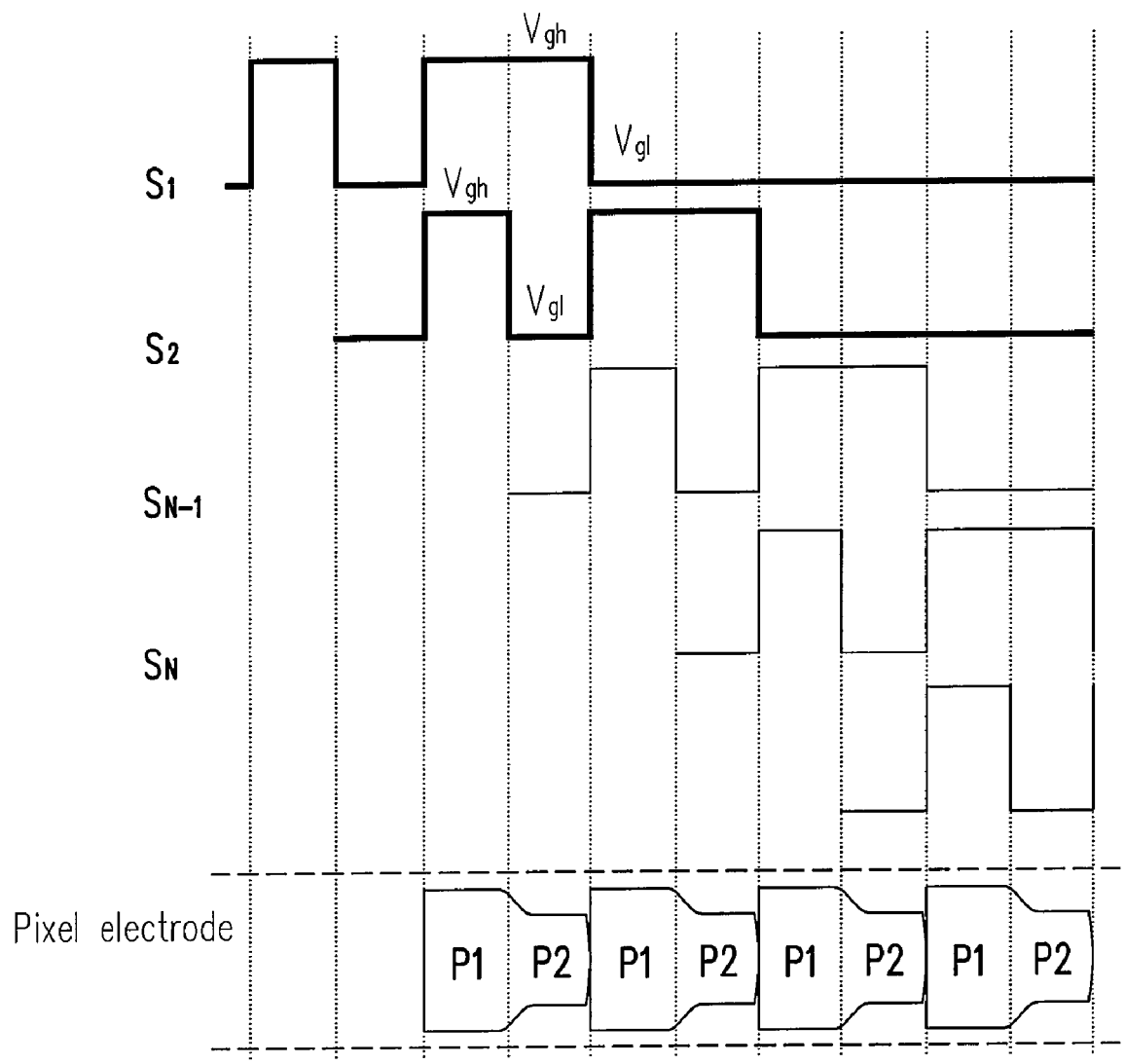
FIG. 3 illustrates a driving waveform for driving a LCD panel according to an embodiment of the present invention.

FIG. 3 illustrates a driving waveform for driving a LCD panel having foregoing active device array substrate according to an embodiment of the present invention. Referring to both FIG. 2A and FIG. 3, the driving method of the present invention includes sequentially turning on the first active devices 230 and the second active devices 240 of the pixel units 200 connected to the scan lines 210 with scan signals $S_1$, $S_2$, ..., $S_{N-1}$, and $S_N$ to sequentially input data signals P1 and P2 into pixel units 200 of different columns through data lines. Generally, a scan signal has two voltage levels $V_{gh}$ and $V_{gl}$. When the voltage level of the scan signal is $V_{gh}$, the first active devices 230 and the second active devices 240 of the pixel units 200 connected to the scan line 210 are turned on, and when the voltage level of the scan signal is $V_{gl}$, the first active devices 230 and the second active devices 240 of the pixel units 200 connected to the scan line 210 are turned off. Specifically, the method for inputting the data signals into each pixel unit 200 includes following steps. First, the first active devices 230 and the second active devices 240 of the pixel units 200 connected to the scan line 210 and the next scan line 210' are turned on simultaneously to input the data signal P1 transmitted by the data line 220 into the second pixel electrode 260 of the pixel units 200 connected to the scan line 210. Next, the first active devices 230 and the second active devices 240 of the pixel units 200 connected to the next scan line 210' are turned off, and when the first active devices 230 and the second active devices 240 of the pixel units 200 connected to the next scan line 210' are turned off and the first active devices 230 and the second active devices 240 of the pixel units 200 connected to the scan line 210 are still turned on, the data signal P2 transmitted by the data line 220 is inputted into the first pixel electrode 250 of the pixel unit 200 connected to the scan line 210. After that, the first active devices 230 and the second active devices 240 of the pixel units 200 connected to the scan line 210 are turned off. The data signal P1 is different from the data signal P2 (i.e. P1≠P2).

As shown in FIG. 3, since the data signals P1 and P2 to be inputted into the same pixel unit are outputted continuously, data reordering procedure is not necessary to various data signals from the data lines 220. Accordingly, the design of the driving circuit in the present invention can be simplified and the fabricating cost thereof can be reduced.

Figure 4:
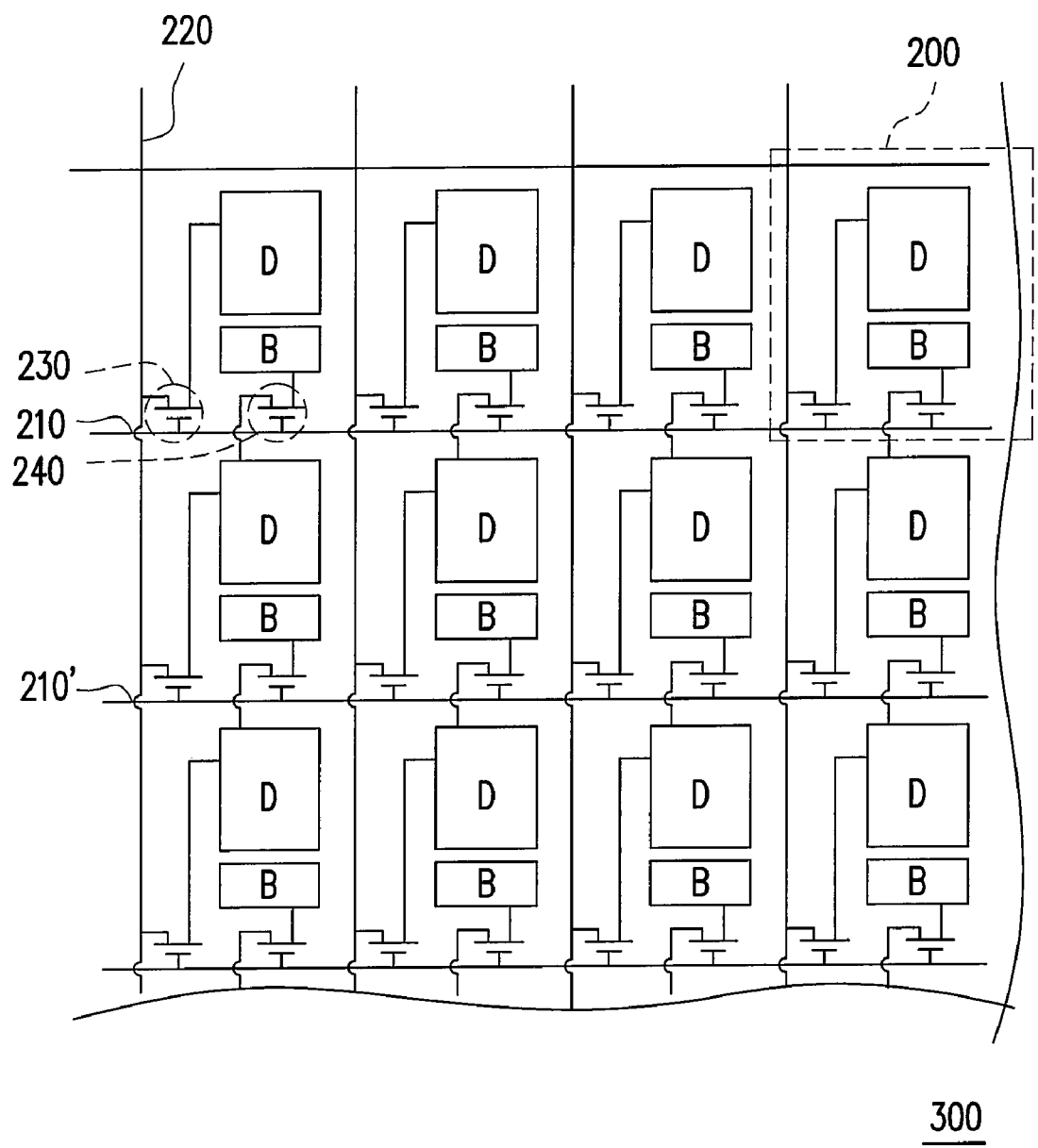
FIG. 4 is a diagram of a LCD panel according to an embodiment of the present invention.
Figure 5:
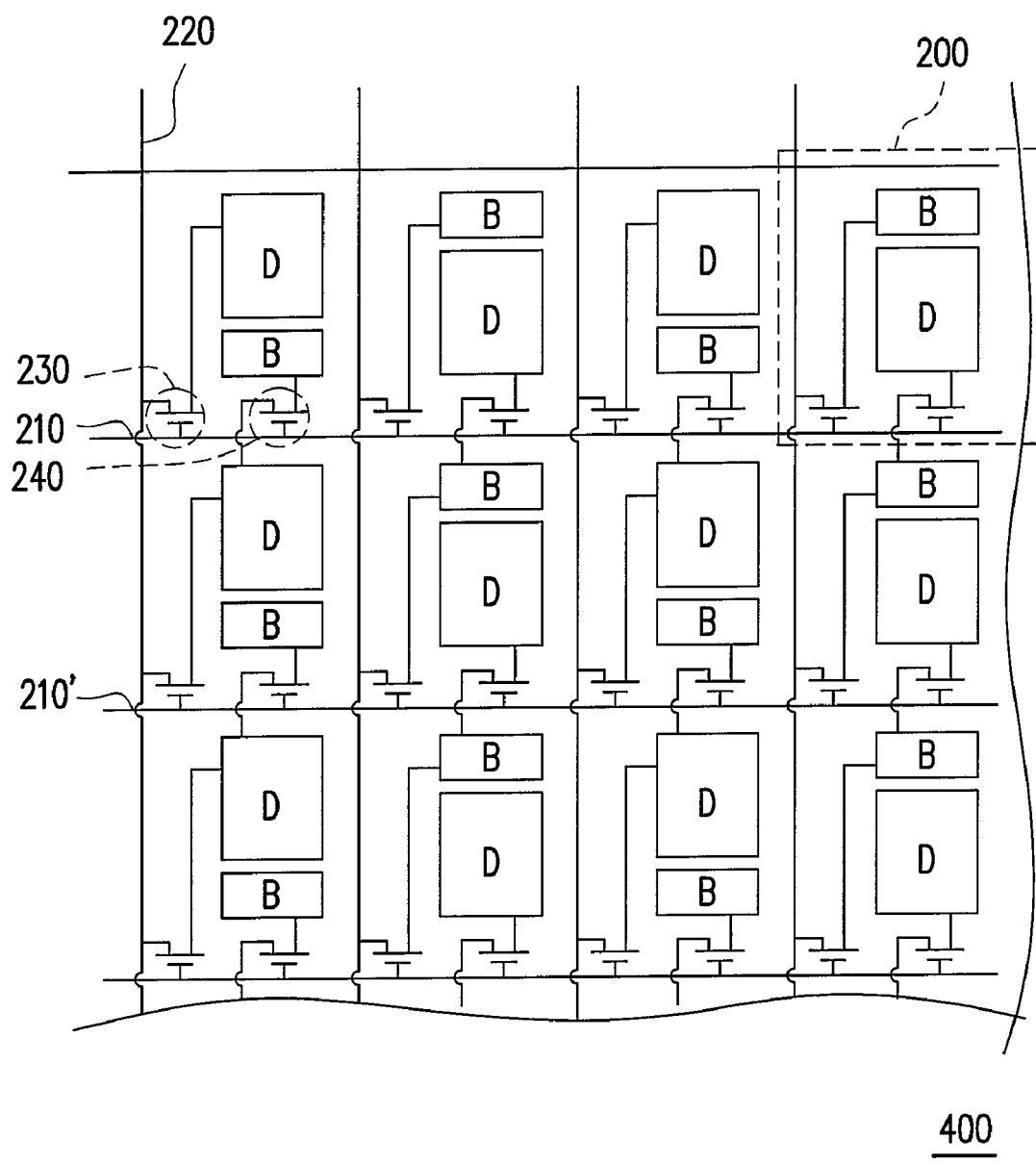
FIG. 5 is a diagram of a LCD panel according to another embodiment of the present invention.

FIG. 4 is a diagram of a LCD panel according to an embodiment of the present invention. Referring to FIG. 4, the LCD panel 300 has an active device array substrate as shown in FIG. 2B. When the data signals P1 and P2 (as shown in FIG. 3) are respectively inputted into the second pixel electrode 260 and the first pixel electrode 250, the LCD panel 300 presents dark regions D and bright regions B of different brightness, and the dark regions D and bright regions B of different brightness can reduce the color shift of the LCD panel 300. In FIG. 4, the dark regions D controlled by the same scan line 210 are aligned with each other in the direction of line, and the bright regions B controlled by the same scan line 210 are also aligned with each other in the direction of line. However, the layout of the dark regions D and the bright regions B in the LCD panel 300 is not limited in the present invention, and the layout illustrated in FIG. 5 may also be adopted.

As described above, in the present invention, different active devices controlled by the same scan line are used for driving different pixel electrodes in the same pixel unit, and the source of one of the active devices is connected to the next scan line so that the same pixel unit can present regions of two different brightness, and accordingly color shift produced while changing the viewing angle can be reduced. Meanwhile, by sequentially turning on the first active devices and the second active devices of the pixel units connected to the scan lines, data signals can be sequentially inputted into pixel units of different columns in the LCD panel without data reordering. Accordingly the driving method in the present invention is simple, and the circuit memory space and fabricating cost are both reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:
   a plurality of scan lines;
   a plurality of data lines;
   a plurality of pixel units connected to the scan lines and the data lines correspondingly, each of the pixel units comprising:
      a first active device having a first gate, a first source, and a first drain, wherein the first source is connected to one of the data lines;
      a second active device having a second gate, a second source, and a second drain, wherein the first gate and the second gate are connected to the same scan line;
      a first pixel electrode connected to the first drain; and
      a second pixel electrode connected to the second drain, wherein the second source in each pixel unit is connected to the first pixel electrode of an adjacent pixel unit controlled by the next scan line.

2. The active device array substrate as claimed in claim 1, wherein the area of the first pixel electrode and that of the second pixel electrode are substantially equal.

3. The active device array substrate as claimed in claim 1, wherein each active device comprises a thin film transistor.

4. The active device array substrate as claimed in claim 3, wherein the thin film transistor comprises an a-Si thin film transistor or a poly-Si thin film transistor.

5. The active device array substrate as claimed in claim 1, wherein the first pixel electrodes in the pixel units of a same line are aligned with each other in the direction of the line.

6. The active device array substrate as claimed in claim 5, wherein the second pixel electrodes in the pixel units of the same line are aligned with each other in the direction of the line.

7. The active device array substrate as claimed in claim 1, wherein in the pixel units of a same row the first pixel electrodes connected to even data lines are aligned with each other in the direction of the row, while the first pixel electrodes connected to odd data lines are aligned with each other in the direction of the row.

8. The active device array substrate as claimed in claim 7, wherein the area of each first pixel electrode connected to even data lines is substantially different from that of each first pixel electrode connected to odd data lines.

9. The active device array substrate as claimed in claim 1, wherein the first active device and the second active device are located at the same side of the scan line connected thereto.

10. A driving method for a liquid crystal display (LCD) panel, wherein the LCD panel has an active device array substrate as claimed in claim 1, the driving method comprising:

sequentially turning on the first active devices and the second active devices of the pixel units connected to the scan lines to sequentially input data signals into the pixel units located at different columns, wherein the step of inputting data signals into each pixel unit comprises:

simultaneously turning on the first active device and the second active device of the pixel unit connected to the scan line and the first active device and the second active device of the adjacent pixel unit connected to the next scan line to input a data signal into the second pixel electrode; and sequentially turning off the first active devices and the second active devices of the adjacent pixel unit connected to the next scan line and the first active devices and the second active devices of the pixel unit connected to the scan line to input another data signal into the first pixel electrode.

11. The driving method as claimed in claim 10, wherein the input data signal is P1 when the first active device and the second active device of the pixel unit connected to the scan line and the first active device and the second active device of the adjacent pixel unit connected to the next scan line are turned on simultaneously, the another input data signal is P2 when the first active device and the second active device of the adjacent pixel unit connected to the next scan line are turned off and the first active device and the second active device of the pixel unit connected to the scan line are still turned on, and wherein P1 ≠P2.

* * * * *